(12) United States Patent
Falath et al.

(10) Patent No.: US 11,413,581 B2
(45) Date of Patent: Aug. 16, 2022

(54) BUBBLE FEED MEMBRANE DISTILLATION SYSTEM

(71) Applicant: King Fahd University of Petroleum and Minerals, Dhahran (SA)

(72) Inventors: Wail Sulaiman Falath, Dhahran (SA); Dahiru Umar Lawal, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 0 days.

(21) Appl. No.: 16/799,352

(22) Filed: Feb. 24, 2020

(65) Prior Publication Data

US 2021/0260531 A1 Aug. 26, 2021

(51) Int. Cl.
*B01D 61/36* (2006.01)
*C02F 1/04* (2006.01)
*C02F 103/08* (2006.01)

(52) U.S. Cl.
CPC ............ *B01D 61/364* (2013.01); *C02F 1/043* (2013.01); *C02F 1/048* (2013.01); *C02F 2103/08* (2013.01)

(58) Field of Classification Search
CPC .... B01D 61/36; B01D 61/364; B01D 61/366; B01D 61/368
See application file for complete search history.

(56) References Cited

U.S. PATENT DOCUMENTS

| | | | |
|---|---|---|---|
| 6,911,121 B1 | 6/2005 | Beckman | |
| 8,460,551 B2 * | 6/2013 | Al-Arifi | C02F 1/14 210/640 |
| 8,470,179 B2 | 6/2013 | Al-Arifi et al. | |
| 10,239,770 B2 * | 3/2019 | Lee | B01D 61/364 |
| 10,766,794 B2 * | 9/2020 | Lee | B01D 61/366 |
| 2004/0238343 A1 | 12/2004 | Kuo et al. | |
| 2011/0290725 A1 * | 12/2011 | Al-Arifi | B01D 61/364 210/640 |
| 2013/0199976 A1 * | 8/2013 | Jeong | C02F 1/447 977/734 |
| 2016/0310900 A1 * | 10/2016 | Francis | B01D 61/368 |
| 2019/0299164 A1 | 10/2019 | Khalifa | |

FOREIGN PATENT DOCUMENTS

WO 2016/006666 A1 1/2016

OTHER PUBLICATIONS

Biniaz, et al. ; Water and Wastewater Treatment Systems by Novel Integrated Membrane Distillation (MD) ; MDPI chemengineering ; Jan. 15, 2019 ; 36 Pages.
Duong ; Membrane Distillation for Strategic Desalination Applications ; University of Wollongong ; School of Civil, Mining, and Environmental Engineering ; 2017 ; 183 Pages.
Warsinger, et al. ; Thermodynamic Design and Fouling of Membrane Distillation Systems ; Massachusetts Institute of Technology ; Jun. 2005 ; 304 Pages.

* cited by examiner

*Primary Examiner* — Jonathan Luke Pilcher
(74) *Attorney, Agent, or Firm* — Oblon, McClelland, Maier & Neustadt, L.L.P.

(57) ABSTRACT

Devices and techniques may improve the permeate productivity in membrane distillation separation by modifying the feed and/or coolant sides of a membrane distillation module depending on the membrane distillation configuration. The bubbling of a carrier gas through the feed liquid in the feed liquid side of the module can increase the turbulent dissipation rate and/or enhance mass transfer across the membrane pores.

18 Claims, 10 Drawing Sheets

BUBBLE FEED MEMBRANE DISTILLATION SYSTEM

BACKGROUND OF THE INVENTION

Field of the Invention

The present disclosure relates to devices and methods for membrane distillation and separation of volatile chemicals from bulks, particularly to membrane distillation modules using a bubbling stream through the fluid on a feed side of a membrane, as well as to a method of percolating gas(es) through membrane distillation feed streams, which may enhance the throughput of the distillation.

Description of the Related Art

The membrane distillation process is a hybrid thermal-membrane separation process that employs one or more porous hydrophobic membranes for separating volatile compounds from non-volatile components. The volatile components pass through the pores of the membrane(s), while the non-volatile components are retained on the feed side of the module. The driving force responsible for the separation of the components is the partial pressure difference across the membrane, which may be induced by a temperature difference between the two sides of the membrane material. In membrane distillation processes, only vapor/gas molecules are capable of passing through the pores of the membrane material.

Membrane distillation can be operated at atmospheric pressure and at temperatures below 100° C. Therefore, renewable energy sources, low-grade energy sources, and waste heat from other thermal processes can be used to drive membrane distillation systems. The membrane distillation system is simple to operate, can handle highly concentrated feed solutions, does not require feed pre-treatment, and offers high product purity including high rejection of ions, colloids, cells, macromolecules, and other nonvolatile organic compounds. These features can make the membrane distillation separative process an energy efficient, cost effective, and environmental friendly process.

Membrane distillation is practiced in four main configurations. These configurations include direct contact membrane distillation (DCMD), air gap membrane distillation (AGMD), vacuum membrane distillation (VMD), and sweeping gas membrane distillation (SGMD). A further membrane distillation configuration, which is less significantly practiced, is called thermostatic sweeping gas membrane distillation (TSGMD). A new membrane distillation configuration known as liquid or permeate gap membrane distillation (LPMD) was recently introduced. Still more recently, liquid or permeate gap membrane distillation with gap recirculation (LGMD with gap circulation) was proposed. In existing membrane distillation configurations, the hot feed solution is maintained in direct contact with the hot side of the membrane surface. The differences in all these configuration lies in the permeate side of the membrane surface. FIGS. 8 to 10 show the four basic configurations of standard membrane distillation process.

The membrane distillation configurations have been well studied in the art, with each configuration having certain significant advantages, drawbacks, and areas of application. Among these configurations, the most commonly use technique is the direct contact membrane distillation (DCMD) due to its simplicity in terms of operation and construction. In direct contact membrane distillation (DCMD), both the feed solution and the permeate solution are in direct contact with both sides of membrane surfaces. In direct contact membrane distillation (DCMD), the cold permeate liquid flows on a permeate side and directly condenses vapor passing through the pores of the membrane. The vapor pressure difference induced by the transmembrane temperature difference is a driving force of vapor across the membrane.

Liquid (or permeate) gap membrane distillation (LGMD) is a combination of direct contact membrane distillation (DCMD) and air gap membrane distillation (AGMD). In liquid gap membrane distillation (LGMD), stagnant permeate liquid is interposed between the cold side of the membrane surface and the cooling plate instead of stagnant air as employed in air gap membrane distillation (AGMD) or flowing permeate liquid as used in direct contact membrane distillation (DCMD). In the liquid gap membrane distillation (LGMD) process, vapor generated in the feed side of the membrane surface travels across the membrane pores and condenses on stagnant permeate liquid in a liquid gap. Performance comparisons between liquid gap membrane distillation (LGMD) and air gap membrane distillation (AGMD) indicate higher thermal efficiency and temperature polarization effects for air gap membrane distillation (AGMD), but higher permeate flux, heat transfer, overall heat transfer coefficient, and concentration polarization effect for liquid gap membrane distillation (LGMD).

Liquid gap membrane distillation (LGMD) with gap circulation was recently described in *Sep. Purif. Techn.* 2020, 231, 115938, which is incorporated by reference herein in its entirety. LGMD with gap circulation circulates stagnant permeate liquid inside the gap to enhance the heat and vapor mass transfer coefficients. The enhancement in the permeate flux as a result of permeate liquid circulation is believed to be due to the water motion inside water gap. Using permeate liquid circulation versus conventional LGMD (without circulation) enhanced the permeate flux by 80 to 96%, decreased the specific electric energy consumption by 15 to 25%, and increased the gained output ratio by 5 to 22%.

In air gap membrane distillation (AGMD) process, a stagnant air gap is interposed between the cold side of the membrane surface and the cooling plate. The vapor generated in the feed liquid travels across the pores of the membrane sheet and the stagnant air before condensing on the surface of the cooling plate. The air gap in air gap membrane distillation (AGMD) decreases heat loss via conduction and improves the heat efficiency of the membrane distillation. Compared to other membrane distillation configurations, air gap membrane distillation (AGMD) is considered to be most promising in terms of heat/energy recovery.

Vacuum membrane distillation (VMD) employs a vacuum pump on the permeate side of the membrane surface. The vacuum pump continuously removes vapor from the vacuum compartment of the membrane distillation module because of the vapor pressure difference across the membrane. The vapor condensation in vacuum membrane distillation (VMD) takes place in the condenser outside the membrane distillation module, and the vacuum pressure applied is always below than the saturation pressure of the volatile molecules on the feed side.

In sweeping gas membrane distillation (SGMD), the vapor generated in the feed side of the membrane diffuses across the membrane pores to the permeate side of the membrane. Thereafter, the flow of a sweep gas, such as pure $N_2$ or air, sweeps the vapor on the permeate side of the membrane, followed by vapor condensation in a condenser outside the membrane distillation module. In thermostatic sweeping gas membrane distillation (TSGMD), binary mixtures can be separated relying upon a temperature driving force that usually decreases along the module by modifying convectional SGMD to add a thermostatic sweeping gas.

Direct contact membrane distillation (DCMD), also as modified herein, can have advantages including, e.g., a high permeate flux, and the possibility of internal heat recovery. DCMD can have the disadvantages of high conductive heat losses, high temperature polarization effects, and risk of mass contamination of the permeate. DCMD may be applied, inter alia, to desalination/water treatment, the nuclear industry, the food industry, the textile industry, and the chemical and pharmaceutical industries.

Air gap membrane distillation (AGMD), also as modified herein, can have advantages including, e.g., low conductive heat losses, low temperature polarization effects, and the possibility of internal heat recovery. AGMD can have disadvantages including low permeate flux due to resistance to mass transfer. AGMD may be applied, inter alia, to desalination/water treatment, the textile industry, and the chemical industry.

Sweeping gas membrane distillation (SGMD), also as modified herein, can have advantages including, e.g., low conductive heat losses and high permeate flux. SGMD can have the disadvantages of complicated handling of sweeping gases and difficult heat recovery. SGMD may be applied, inter alia, to desalination/water treatment and the chemical industry.

Vacuum membrane distillation (VMD), also as modified herein, can have advantages including, e.g., low conductive heat losses and high permeate flux. VMD can have the disadvantages of higher risk of pore wetting and difficult heat recovery. VMD may be applied, inter alia, to desalination/water treatment, the food industry, the textile industry, and the chemical industry.

Certain research in the field of membrane distillation warrants comment.

US 2019/0299164 A1 by Khalifa (Khalifa), which is incorporated by reference herein in its entirety, discloses a membrane distillation module with a circulating line to circulate a portion of distilled water formed and accumulated in a distillate zone, to enhance a permeate flux of water vapor through a hydrophobic membrane of the membrane distillation module. Khalifa's circulating line circulates distilled water into and out of a distillate zone of the membrane distillation module. Khalifa does not describe bubbling any gas, much less a carrier gas, through the feed. Consequently, Khalifa's devices are not configured to accommodate a carrier gas and lack such features.

US 2004/0238343 A1 by Kuo et al. (Kuo) discloses a method including preparing a membrane distillation module with a hydrophobic porous membrane which is permeable to gas/vapor and impermeable to a solution in the feed side, and injecting a high pressure of an inert gas, such as air, into the solution, such as saline water, in the pretreatment container and forming nano-grade gas bubbles of inert gas in the solution in the membrane distillation module in such a manner that the solution is emulsified with the nano-grade gas bubbles. The nano-grade gas bubbles formed are allowed to pass through the membrane from one side to the other side of Kuo's membrane. Kuo's nano-grade gas bubbles are described as having a diameter less than the mean pore diameter of the hydrophobic porous membrane of the membrane distillation apparatus, i.e., 0.01 to 0.5 micron pores. Kuo's inert gas is used with the aqueous solution in a volume ratio of 1:10 to 1:2. Kuo's aqueous solution with nano-grade gas bubbles is supplied to the feed side at a pressure of 5 to 100 psig, which is depicted as a mixed stream of gas and feed liquid. Kuo requires bubbles with no more than 0.5 micron largest dimension and lacks a carrier gas transfer pipe in the distillate side and the distillate circulation system.

U.S. Pat. No. 6,911,121 to Beckman (Beckman) discloses a continuous contacting apparatus for separating a liquid component from a liquid mixture. Beckman's apparatus has an evaporation chamber with first and second ends; an inlet and an outlet for a carrier gas; and an inlet and an outlet for a liquid mixture. Beckman's liquid mixture inlet and carrier gas outlet are located on the first end of the evaporation chamber. Beckman's apparatus also has a dew-formation chamber with an inlet and an outlet for a carrier gas; and an outlet for the separable liquid component, the carrier gas inlet of the dew-formation chamber being countercurrent to the carrier gas inlet of the evaporation chamber. Beckman's apparatus has a common heat transfer wall thermal communicating between the evaporation chamber and the dew-formation chamber; a feeding device to provide the liquid mixture onto the evaporation side of the heat transfer wall; an air mover for controlling carrier gas flow through the chambers, the evaporation chamber gas flow being countercurrent to the dew-formation chamber gas flow; and a heating apparatus for heating the carrier gas from the evaporation chamber outlet, the heated carrier gas flowing into the dew-formation chamber inlet. Beckman's system does not use a membrane, but instead wettable heat transfer walls of, e.g., polyester gauze, cloth gauze, polypropylene cheesecloth, nylon cheesecloth, and/or polypropylene/nylon cheesecloth, or spacers made of water permeable materials. Beckman instead discloses a form of carrier gas-enhanced conventional distillation.

U.S. Pat. No. 8,470,179 to al-Arifi et al. (al-Arifi) discloses a water distillation system including a membrane distillation unit which produces desalinated water from a salt water feed. Al-Arifi's system includes a primary water heater to raise the feed water temperature upstream of the membrane distillation unit, and an evaporative cooler which lowers a temperature of a coolant upstream of the membrane distillation unit. Al-Arifi describes typical direct contact membrane distillation (DCMD) in an embodiment, including a gas-liquid interface across the membrane, but does not introduce a carrier gas, via an inlet or otherwise, into the feed.

WO 2016/006666 A1 by Nagata et al. (Nagata) discloses a vacuum membrane distillation desalination device for a ship and compact. Nagata's device has a vacuum distillation module with a heater for heating seawater taken into the ship, a heated seawater duct, a vacuum unit, a hydrophobic porous membrane separating the heated seawater duct and the vacuum unit, a cooler to condense the vapor flowing into the vacuum unit through the hydrophobic porous membrane, and a water ejector to decompress the vacuum unit. Nagata's heater heats seawater from a heat source of the ship. Nagata's water ejector decompresses the vacuum unit to a pressure between the maximum vapor tension of water at the seawater temperature of the heated seawater duct and 0.1 atm. Nagata does not disclose bubbling a carrier gas through the distillation module, nor any equipment to accommodate such carrier gas injection into a feed.

*Chem. Eng.* 2019, 3(1), 8, 1-36 by Biniaz et al. (Biniaz) reviews membrane distillation as a method to mitigate pollution caused by industrial and domestic waste and applications in wastewater treatment. Biniaz describes only sweeping gas membrane distillation (SGMD), which sweeps the permeate/distillate side, as well as fouling phenomena on the feed side, but Biniaz does not disclose injecting a gas into the feed side of a membrane distillation module, nor any device configured for such an operation.

The doctoral thesis entitled, "Membrane Distillation for Strategic Desalination Applications," from August 2017 in the School of Civil, Mining and Environmental Engineering, Faculty of Engineering and Information Sciences, at the University of Wollongong by Hung Cong Duong (Duong) discloses membrane distillation to concentrate feed solutions to their saturation points with negligible flux decline, without high hydraulic pressure, and compatibility with low-grade waste heat and solar thermal energy. Duong discloses air gap membrane distillation (AGMD), direct contact membrane distillation (DCMD), vacuum membrane distillation (VMD), and sweeping gas membrane distillation (SGMD) for the purification of seawater or processing of brine, as well as temperature, pressure, and desiccation conditions. Duong does not disclose injecting a gas into the feed side of a membrane distillation module, nor any device configured for such an operation.

The doctoral thesis entitled, "Thermodynamic Design and Fouling of Membrane Distillation Systems," from June 2015 in the Department of Mechanical Engineering at the Massachusetts Institute of Technology by David Elan Martin Warsinger (Warsinger) discloses membrane distillation as a developing technology in thermal desalination using solar and waste heat resources. Warsinger examines membrane distillation efficiency and membrane fouling in air gap membrane distillation (AGMD), permeate gap membrane distillation (PGMD), conductive gap membrane distillation (CGMD), direct contact membrane distillation (DCMD), vacuum membrane distillation (VMD), and sweeping gas membrane distillation (SGMD), based on tilt angle, superhydrophobic surfaces, entropy-generation, heterogeneous nucleation of inorganic salts with a fouling regime map to avoid nucleation, and fouling prevention via induced airlayers. Warsinger does not disclose injecting a carrier gas into the feed side of a membrane distillation module, nor any device configured for such an operation.

In light of the above, a need remains for improved membrane distillation modules and methods, particularly for membrane distillation arrangements implementing carrier gas throughput in the feed side of a membrane distillation module, such as in air gap membrane distillation (AGMD), permeate gap membrane distillation (PGMD), conductive gap membrane distillation (CGMD), direct contact membrane distillation (DCMD), vacuum membrane distillation (VMD), and/or sweeping gas membrane distillation (SGMD), and methods of making and using the same.

SUMMARY OF THE INVENTION

Aspects of the invention provide membrane distillation modules, which may comprise: a vessel with an internal cavity; a hydrophobic membrane dividing the internal cavity into a feed zone and a distillate zone, such that the feed zone and a distillate zone are accessible to each other within the internal cavity only via permeation across the membrane; a feed inlet fluidly connected to the feed zone for delivering a feed stream, comprising a liquid, to the feed zone; a feed outlet fluidly connected to the feed zone for discharging the feed stream from the feed zone; a carrier gas inlet fluidly connected to the feed zone for introducing a carrier gas to the feed zone; a carrier gas outlet fluidly connected to the feed zone and optionally further to the distillate zone, configured to transfer the carrier gas and feed stream vapor from the feed side to the distillate zone and/or to an external condenser; a distillate outlet fluidly connected to the distillate zone; and a carrier gas inlet configured to enter the feed zone in the internal cavity, wherein the membrane is configured such that a portion of the feed stream vapor permeates through the hydrophobic membrane and is transferred to the distillate zone, and wherein the distillate zone is configured such that the vapor condenses in the distillate zone in the form of a distillate. Such modules may be modified by any permutation of the features described herein, particularly the following.

The carrier gas outlet may be fluidly connected to the distillate zone. Inventive modules may further comprise a blower and/or a pump fluidly connected to the carrier gas inlet. Inventive modules may further comprise a blower and/or a pump fluidly connected to the feed inlet.

Inventive modules may further comprise: a thermally conductive divider disposed in the distillate zone to separate a coolant zone from the distillate zone such that the distillate zone is sandwiched between the feed zone and the coolant zone; a coolant; a coolant inlet fluidly connected to the coolant zone suitable for delivering the coolant to the coolant zone; and a coolant outlet fluidly connected to the coolant zone suitable for discharging the coolant from the coolant zone.

Inventive modules may further comprise: a coolant circulating line disposed outside of the internal cavity configured to fluidly connect the coolant outlet to the coolant inlet; and a coolant pump fluidly connected to the coolant circulating line, configured to circulate at least a portion of the coolant in the coolant zone.

Inventive modules may further comprise: a condenser in the distillate zone, the condensation unit being at a lower temperature than the feed zone; a condenser supply, including a condenser inlet, a condenser outlet, and a condenser feed, the condenser supply being configured such that the condenser feed flows through the condenser inlet into the condenser and out of the condenser outlet; and a condenser pump fluidly connected to the condenser inlet, configured to urge the condenser supply through the condenser. The condenser supply may be a closed cycle, such that the volume of the condenser supply remains substantially constant in operation.

Inventive modules may further comprise: a distillate circulating line disposed outside of the distillate zone configured to fluidly connect at least one distillate outlet to at least one distillate inlet; and a pump fluidly connected to the distillate circulating line, configured to circulate at least a portion of the distilled water in the distillate zone.

Inventive modules may further comprise: a heater in fluid contact to the carrier gas, configured to heats the carrier gas before the carrier gas is introduced into the feed zone. The heater may be in direct contact to the carrier gas.

Inventive modules may further comprise: a heater in fluid contact to the feed stream, configured to heats the feed stream before the feed stream is introduced into the feed zone. The heater may be in direct contact to the feed stream.

Inventive modules may further comprise: a vacuum pump in fluid communication to the distillate zone, wherein the carrier gas outlet is fluidly connected to the distillate zone.

The carrier gas inlet may be configured to inject carrier gas including bubbles with an average longest dimension of greater than 5 µm. The carrier gas may include air. The feed stream may include ocean and/or saline seawater.

Aspects of the invention provide methods of concentrating and/or purifying a feed stream, which method may comprise: contacting the feed stream, comprising a liquid and a vapor, with the carrier gas in the feed zone of any permutation of inventive module(s) described herein, and obtaining a permeate containing water in the distillate zone and a concentrated feed stream from the feed stream outlet. Such methods may be modified by any permutation of the features described herein.

Aspects of the invention provide methods of membrane distilling a feed stream, which methods may comprise: providing a feed stream comprising a liquid and a vapor in a feed zone of an air gap membrane distillation, permeate gap membrane distillation, conductive gap membrane distillation, direct contact membrane distillation, vacuum membrane distillation, and/or sweeping gas membrane distillation module; injecting a carrier gas into the feed stream in the feed zone; and allowing a portion of the vapor to permeate from the feed zone through a hydrophobic membrane to condense in a distillate zone of the module. Such methods may be modified by any permutation of the features described herein. The liquid may comprise water and/or the vapor may comprise water vapor.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE INVENTION

Figure 1:
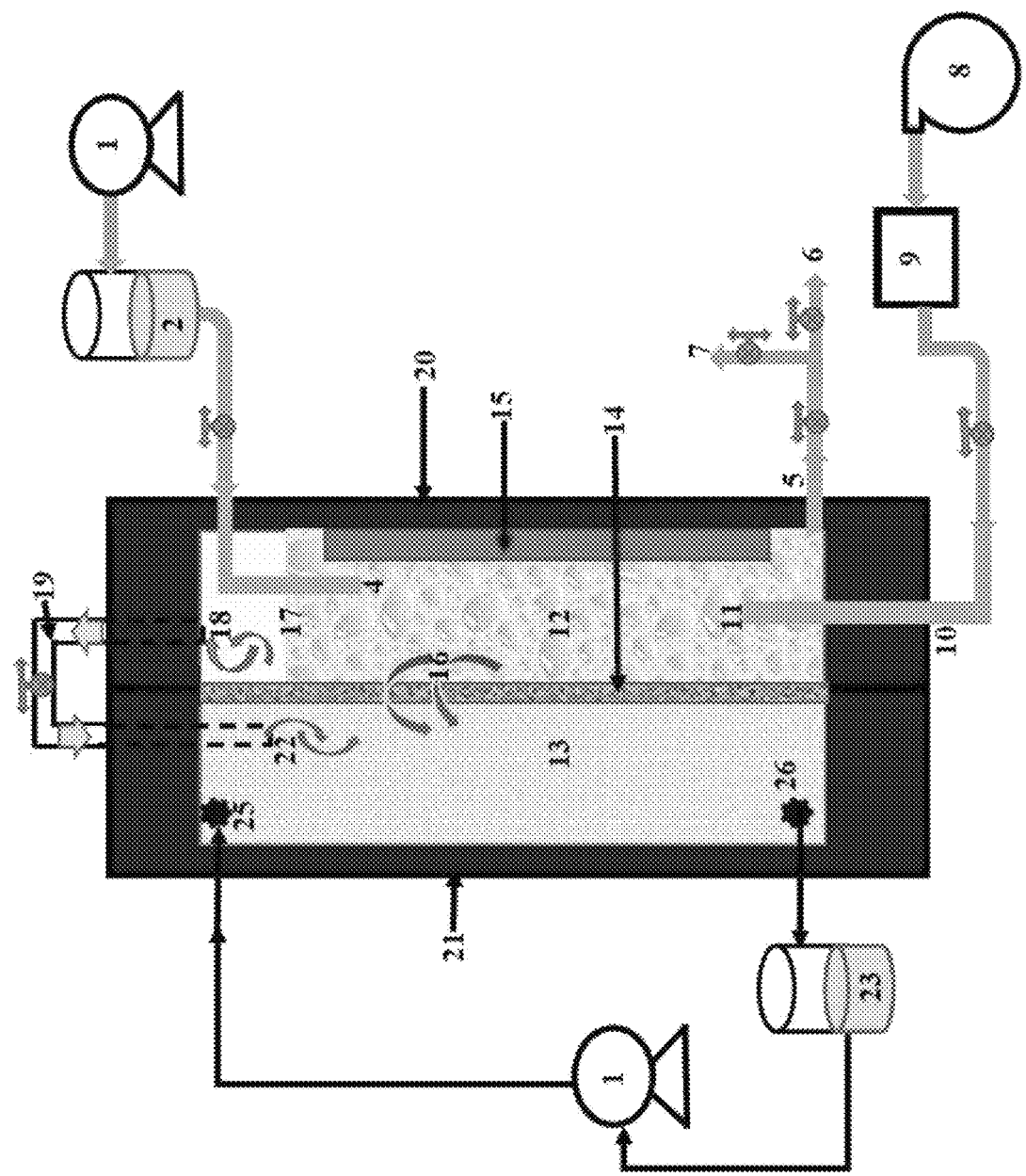
FIG. 1 shows an exemplary arrangement for bubble feed direct contact membrane distillation.

Aspects of the invention provide membrane distillation modules. Such membrane distillation modules may comprise: a vessel with an internal cavity, such as a (stainless) steel, glass-lined steel, copper, glass, polypropylene, and/or (sealed) cement vessels, which may have a wall thickness of, e.g., at least 1.5, 2, 2.5, 3, 4, 5, 6, 7, 10, 15, or 20 cm and/or up to 50, 40, 30, 25, 20, 17.5, 15, 12, or 10 cm. Such membrane distillation modules may comprise: a hydrophobic membrane dividing the internal cavity into a feed zone and a distillate zone, such that the feed zone and a distillate zone are accessible to each other within the internal cavity only via permeation across the membrane, i.e., the feed zones may be physically separated from the distillate (or permeate) zones so as to prevent at least 97.5, 98, 99, 99.1, 99.5, 99.9, 99.99, 99.999, 99.9999, or 99.99999 wt. % of a total liquid feed weight (or all of it) from passing in liquid phase to the distillate zone.

Inventive modules may include several (e.g., 2, 3, 4, 5, 6, 7, 8, 9, 10, or more) feed chambers or pipes, segregated from the distillate/permeate zone(s) by membranes which may be cylindrical, rectangular prismatic, and/or hexagonal prismatic in shape and/or coiled (or the feed chambers may have such shapes, as well as a distillate outlet (or a plurality thereof, e.g., at least 2, 3, 4, 5, or more and/or up to 100, 80, 60, 50, 40, 30, 25, 20, 15, or 10 outlets, e.g., per 1, 0.75, 0.5, 0.4, 0.33, 0.25, or 0.2 m$^2$ internal cavity surface area) fluidly connected to the distillate zone. Such membrane distillation modules may comprise: a feed inlet fluidly connected to the feed zone for delivering a feed stream, comprising a liquid and optionally further a vapor, particularly of the liquid, to the feed zone; a feed outlet fluidly connected to the feed zone for discharging the feed stream from the feed zone. The feed zone may include one or more heaters, which may be powered by photovoltaic electricity and/or heated by a heating fluid which is a thermally solar heated, such as water, ethylene glycol, and/or propylene glycol.

Such membrane distillation modules may comprise: a carrier gas inlet (or a plurality thereof, e.g., at least 2, 3, 4, 5, 6, 7, 8, 9, 10, or more and/or up to 100, 75, 50, 40, 30, 25, 20, 16, 14, 12, 10, 8, or 6 carrier gas inlets, e.g., per 1, 0.75, 0.5, 0.4, 0.33, 0.25, or 0.2 m$^2$ internal cavity surface area) fluidly connected to the feed zone for introducing a carrier gas to the feed zone; and a carrier gas outlet (or corresponding number to the inlets, or more or fewer, e.g., by a factor of 5, 4, 3, 2.5, 2, 1.75, 1.5, or 1.25) fluidly connected to the feed zone and optionally further to the distillate zone, configured to transfer the carrier gas and feed stream vapor from the feed side to the distillate zone and/or to an external condenser. The carrier gas inlet(s) may be configured to enter the feed zone in the internal cavity, such that the carrier gas is release/injected into the internal cavity, typically containing a volume of the feed, rather than combining the carrier gas and the feed upstream of the feed zone/internal cavity, though combination upstream may be implemented. The membrane typically allows at least a portion of the feed stream vapor to permeate through the hydrophobic membrane and be transferred to/permeate to the distillate zone, and wherein the distillate zone is configured such that the vapor condenses in the distillate zone in the form of a distillate.

While their particular location in the internal cavity is not a functional requirement, the carrier gas inlet(s) of the modules may be arranged in the lower two-thirds, or lower half of the height of the internal cavity, e.g., up to 90, 80, 75, 70, 65, 60, 55, 50, 45, 40, 35, 33, 30, or 25% of the height (from the base). The carrier gas inlet(s) should typically lead and/or inject gas into a bulk of the feed liquid, thereby generating bubbles and/or creating agitation within the feed bulk in the internal cavity. Carrier gas inlet(s) may be arranged to project carrier gas at an angle in a range of, e.g., at least 15, 18, 21, 24, 27, 30, 33, 36, 39, 42, 45, or 60° and/or up to 90, 87, 84, 81, 78, 75, 72, 69, 66, 63, 60, 57, 54, 51, 48, 45, or 30° to a plane of the surface with the internal cavity of the module (e.g., extrapolated from an orthogonal at 90° to the surface). The carrier gas inlet(s) may be arranged such that they direct carrier gas at least partially into each other, to maximize the agitation. The carrier gas inlet(s) may include, for example, sparger pipes, porous sparger tips, ring spargers, dip pipes, multi-outlet heads, and/or single-hole outlets. Useful spargers may comprise sintered metals, ceramics, and/or glass.

The carrier gas outlet(s) may be fluidly connected to the distillate zone, e.g., looping from the feed zone to the distillate zone. The carrier gas outlet, typically leading carrier gas laden with feed vapor, may be located in an upper half, third, or fourth of the height of the internal cavity, e.g., up to 50, 40, 33, 30, 27.5, 25, 22.5, 20, 17.5, 15, 12.5, 10, 7.5, 5, 2.5 of the height (from the top) or mounted on the top/roof. The carrier gas outlet(s) may include simple cylindrical piping, or may contain one or more intervening condenser and/or filter elements. Inventive modules may further comprise one, two, three, or more blowers and/or pumps fluidly connected to the carrier gas inlet (and/or to a source of the carrier gas). In the case of air or an expanded gas may include a compressor in the apparatus, so as to urge gas from outside to inside of the internal cavity into the feed zone. In the case of a sweeping gas approach using air, the pump(s)/blower(s) for the carrier gas may be used in combination for the aeration of the distillate side as a sweeping gas. Such a combined application may alternatively or additionally include the cooling fluid, when air cooling is implemented for the coolant. Inventive modules may further comprise one, two, three, or more blowers and/or pumps fluidly connected to the feed inlet (and/or to a source of the carrier gas). The feed pump may likewise be combined with the pumping of cooling fluid, when seawater or ocean water is used for the coolant.

Inventive modules may further comprise: a thermally conductive divider disposed in the distillate zone to separate a coolant zone from the distillate zone such that the distillate zone is sandwiched between the feed zone and the coolant zone. The thermally conductive divider may be configured such that the coolant zone is hermetically sealed from the distillate zone. The thermally conductive divider may span a cross-section of the internal cavity, or the thermally conductive divider may be in the form of finger(s) or spiral(s) to cycle a coolant, such as water, expanding gas, and/or secondarily cooled fluid (e.g., subterranean), through the coolant zone. Cooling may also be achieved electrically, e.g., with a typical cooling finger, which may optionally be powered with photovoltaic electricity. The coolant inlet(s) and outlet(s) fluidly may be connected to the coolant zone in a manner suitable for delivering the coolant to and from the coolant zone(s).

In the case of using seawater (or open water body sources) as a coolant, the outlet may empty back into the open water body source. It may be preferable to cycle a fixed amount of coolant (e.g., water, or mixtures with freezing point depressants and/or boiling point elevators) in a closed loop as the coolant with a secondary cooling source, such as a closed (hermetically sealed) coil within the water body or some other heat dump or artificial cooling source. For example, inventive modules may further comprise: a coolant circulating line disposed outside of the internal cavity configured to fluidly connect the coolant outlet to the coolant inlet; and a coolant pump fluidly connected to the coolant circulating line, configured to circulate at least a portion of the coolant in the coolant zone. Some or all of the electrical draw of the apparatus and its components, such as pumps, blowers, heaters, coolers, etc., may be provided by photovoltaic generation.

In addition or alternatively to the coolant loop, inventive modules may further comprise: a condenser in the distillate zone, the condensation unit being at a lower temperature than the feed zone (e.g., no more than 30, 25, 20, 17.5, 15, 12.5, 10, 7.5, or 5° C.); a condenser supply (which may be a loop, or may be open, or may include a plurality of loops and/or open flows), including a condenser inlet, a condenser outlet, and a condenser feed, the condenser supply being configured such that the condenser feed flows through the condenser inlet into the condenser and out of the condenser outlet; and a condenser pump fluidly connected to the condenser inlet, configured to urge the condenser supply through the condenser. The condenser supply may be a closed cycle, such that the volume of the condenser supply remains substantially constant in operation, which may involve some kind of secondary cooling from a cold fluid or mass, such as a body of water.

Inventive modules may further comprise: a distillate circulating line disposed outside of the distillate zone configured to fluidly connect at least one distillate outlet to at least one distillate inlet (e.g., 1, 2, 3, 4, or 5 inlets and/or up to 20, 15, 10, 8, 6, or 5 inlets); and a pump fluidly connected to the distillate circulating line, configured to circulate at least a portion, e.g., at least 5, 10, 15, 25, 33, 40, or 50 wt. %, of the distilled water in the distillate zone. The distillate may be stored, for example, below ground, to maintain a lower temperature than the feed zone, but as a consequence of the condensation, particularly aided by cooling/condensers, the temperature should be lower than in the feed zone.

Inventive modules may further comprise: a heater in fluid contact to the carrier gas, configured to heats the carrier gas before the carrier gas is introduced into the feed zone. The heater may be in direct contact to the carrier gas, i.e., the gas may contact the heater surface, or the gas may be contacted by a surface of a cycling, relatively hot fluid heated by the heater, such as in a thermal solar apparatus and/or with geothermal heating. The carrier gas may be expanded off of the condenser, thereby cooling the condenser or distillate zone, before being directed into the feed zone. Additionally or alternatively, inventive modules may further comprise: a heater in fluid contact to the feed stream, configured to heats the feed stream before the feed stream is introduced into the feed zone. The heater may be in direct contact to the feed stream, or, as described for the carrier gas, the feed stream may be heated indirectly. The feed stream itself may be directly incubated in a thermal solar pipe system before flowing into the feed zone, and/or the feed stream may be heated by photovoltaic, wind, geothermal, or other electrical sources. The feed stream may be used as a coolant for a power plant or incinerator (or may be secondarily cooled by power plant or incinerator coolant), then fed into the feed zone. In the case of concentrating a product, wherein (unlike desalinating water), the concentrated product is sought, the feed stream may be preferably relatively hermetically sealed, at least upstream of the feed zone, and heating may be preferably applied electrically.

Inventive modules may further comprise: a vacuum pump in fluid communication to the distillate zone, wherein the carrier gas outlet is fluidly connected to the distillate zone. In such a case, the carrier gas outlet(s) may preferably be fluidly disconnected from the distillate zone, e.g., such that a vacuum can be generated within the distillate zone without affecting the feed zone dynamics. While implementing an underpressure in the distillate zone, it may be useful to include one or more (additional) condensers downstream of the distillate zone and upstream of the vacuum pump. Further distillate or all of the distillate may be collected off of such downstream condensers in such an arrangement.

The carrier gas inlet may be configured to inject carrier gas including bubbles with an average longest dimension of greater than 5, 10, 15, 25, 50, 75, 100, 150, 200, 250, 500, or 1000 μm. The carrier gas may include at least 75, 80, 85, 90, 91, 92, 92.5, 93, 94, 95, 96, 97, 97.5, 98, 99, 99.1, 99.5, or 99.9 wt. % or all of its total weight of air, $N_2$, $CO_2$, Ar, and/or He. The feed stream may include ocean water, brackish water, and/or saline seawater. The feed stream may alternatively include orange juice, grape juice, apple juice, apple puree, and other dilute food and/or drink products. The feed stream may alternatively include a wet solvent, such as ethanol, methanol, propanol, isopropanol, toluene, THF, pyridine, dioxane, diethyl ether, MTBE, tert-butanol, NMP, cyclohexane, decalin, o-dichlorobenzene, pyrrole, etc.

Aspects of the invention provide methods of concentrating (particularly in the sense of a feed stream, e.g., wherein the dehydrated product is sought) and/or purifying a feed stream (particularly, e.g., wherein the distillate is of value and/or greater value than the concentrate), which method may comprise: contacting the feed stream, comprising a liquid and a vapor, with the carrier gas in the feed zone, particularly wherein the first contact of the carrier gas and the feed stream is in the feed zone within the internal cavity, of any permutation of inventive module(s) described herein, and obtaining a permeate containing water (or some other permeate/distillate) in the distillate zone and a concentrated feed stream from the feed stream outlet. Such methods may include arrays of several module in series and/or in parallel, including any combination of air gap membrane distillation, permeate gap membrane distillation, conductive gap membrane distillation, direct contact membrane distillation, vacuum membrane distillation, and/or sweeping gas membrane distillation modules.

Aspects of the invention provide methods of membrane distilling a feed stream, such as any described herein, whereby the membrane distillation includes: providing a feed stream comprising a liquid and a vapor in a feed zone of any type of membrane distillation module, such as an air gap membrane distillation, permeate gap membrane distillation, conductive gap membrane distillation, direct contact membrane distillation, vacuum membrane distillation, and/or sweeping gas membrane distillation module; injecting a carrier gas into the feed stream in the feed zone, particularly wherein the carrier gas is in a separate stream from the feed stream, and wherein the feed stream fills at least 33, 40, 45, 50, 55, 60, 65, 67.5, 70, 72.5, 75, 77.5, 80, 82.5, or 85% of the feed zone volume and/or up to 95, 90, 85, 80, 75, 67, 60, or 50% of the feed zone volume; and allowing a portion of the vapor to permeate from the feed zone through a hydrophobic membrane to condense in a distillate zone of the module. The liquid may comprise water and/or the vapor may comprise water vapor, though the feed may enter the feed zone as ostensible only a liquid.

Inventive arrangements and methods may use a portion of $CO_2$ and/or $NH_3$ in the carrier gas, e.g., up to 40, 33, 25, 20, 15, 10, 7.5, 5, 4, 3, 2, 1, 0.5, 0.1, 0.01, 0.001, 0.0001, or 0.00001 mol. %, relative to the total carrier gas moles, of $CO_2$ and/or $NH_3$.

Inventive arrangements may use a single material for the membrane, such as polypropylene (PP), polyethylene (PE), polyvinylchloride (PVC), polyvinylidene fluoride (PVDF), polytetrafluoroethylene (PTFE), polychlorotrifluoroethylene, polyhexafluoropropylene (PHFP), poly-vinylidene fluoride-co-chlorotrifluoroethylene (PVDF-co-CTFE), poly-vinylidene fluoride-co-hexafluoropropylene (PVDF-co-HFP), poly-vinylidene fluoride-co-tetrafluoroethylene (PVDF-co-TFE), or may use combinations of such materials, generally including mostly or only hydrophobic materials, which are configured to be permeable to the gas to be distilled and/or to the carrier gas.

Inventive devices and methods may be configured for any type of membrane distillation described herein, such as air gap membrane distillation (AGMD), permeate gap membrane distillation (PGMD), conductive gap membrane distillation (CGMD), direct contact membrane distillation (DCMD), vacuum membrane distillation (VMD), and/or sweeping gas membrane distillation (SGMD), and may involve series and/or parallel arrangements of any combination of such modules, including, e.g., at least 2, 3, 4, 5, 6, 7, 8, 9, 10, or more and/or up to 100, 80, 60, 50, 40, 30, 25, 20, 15, or fewer modules in any permutation.

Aspects of the inventive distillation system are shown in FIGS. 1 to 7, discussed in more detail below, including a feed liquid (side) compartment (20), a coolant liquid (side) compartment (21), membrane material (14), water heaters including a hot feed liquid tank (2) heater and a feed liquid heater (15), a carrier gas (e.g., air) heater (9), pumps (1), optionally a vacuum pump (36), blower-compressor (8) and/or blower-fan (39)—which may be the identical devices, a hot feed liquid tank (2), a cold permeate liquid tank (23), external condenser/heat exchanger (31), and a condensation and/or cooling plate/surface (28).

Useful heat sources for inventive systems may include renewable energy sources (photovoltaic, solar-thermal, geothermal, hydroelectric, wind, bio-gas, etc.), low-grade energy sources, electrical energy, waste heat from other thermal processes, or combinations of these, as well as traditional sources.

Feed liquid(s) in the feed compartment may be arrested/made stagnant by closing valves, e.g., between a pump (1) and a hot feed liquid tank (2) or at some point before entry into the still. Feed liquid(s) may flow naturally under gravity by partially opening valves, e.g., between a pump (1) and a hot feed liquid tank (2) or at some point before entry into the still, to attain the desire flow rate. Feed liquid(s) may also be forced flow by using one or more variable pumping and control systems to reach a desired flow rate.

Hot feed liquid may be obtained from one or more hot feed liquid tanks and/or liquid heater(s) located inside the liquid feed compartment(s). Movement and control of compressed carrier gas(es) may be achieved using one or more blowers, compressors, and/or vacuum pumps. Carrier gases may be heated before injection into the feed liquid or supplied under ambient temperature, pressure, and/or flow conditions. The heating for the feed liquid(s) and/or carrier gas(es) may be supplied by any combination of the energy sources listed above, e.g., solar-thermal, photovoltaic, wind, hydroelectric, biogas, etc., as well as natural gas, nuclear, coal, waste combustion, and the like.

The point(s) of carrier gas injection/inlet into the feed liquid(s) and/or cooling compartment(s) may be a single point injection, or at least 2, 3, 4, 5, 6, or more and/or up to 100, 80, 75, 70, 65, 60, 55, 50, 45, 40, 35, 30, 25, 20, 15, 10, or fewer injection points/inlets, e.g., multiple point injections such as with a sparger orifice.

The feed liquid may include municipal water, well water, distilled water, deionized water, (inert) solvent, seawater, wastewater, brackish water, flowback/produced water, fruit juice(s), blood, milk, dyes, harmful waste flows, etc., while the carrier gas may be nitrogen, air, helium, argon, carbon dioxide, combustion exhaust, or any combination of two or more of any of these. Beyond water, useful solvents may include, for example, pyridine, N,N-dimethylformamide (DMF), N,N-dimethylacetamide, N-methyl pyrrolidone (NMP), hexamethylphosphoramide (HMPA), dimethyl sulfoxide (DMSO), acetonitrile, tetrahydrofuran (THF), 1,4-dioxane, dichloromethane, chloroform, carbon tetrachloride, dichloroethane, acetone, ethyl acetate, pet ether, pentane, hexane(s), cyclohexane, decane(s), decalin, THF, dioxane, benzene, toluene, xylene(s), o-dichlorobenzene, diethyl ether, methyl t-butyl ether, diisopropyl ether, ethylene glycol, dimethoxyethane, diglyme, methanol, ethanol, isopropanol, propanol, and/or n-butanol.

Inventive systems may generate vapor (i) via vapor associated with the carrier gas and/or (ii) vapor transported across the membrane pores. The driving force for mass/vapor transfer across the pores of the membrane may be the partial pressure difference across the membrane induced by the temperature difference between the two sides of the membrane surfaces, the membrane typically having a planar layout having two sides of similar surface area.

Aspects of the invention include new bubble feed membrane distillation (BFMD) systems that can exhibit enhanced permeate productivity compared to traditional membrane distillation systems. Inventive systems may generate vapor from (i) vapor associated with the carrier gas and/or (ii) vapor across the pores of membrane.

The driving force for vapor permeation across the membrane may be the partial pressure difference between the two sides of the (typically planar) membrane generated by the temperature difference between the two sides of the membrane. Carrier gas(es) may be bubbled through the feed liquid(s) in one or more feed compartments. Humidified carrier gas(es) may be bubbled through the permeate liquid(s) in one or more permeate zones.

Figure 2:
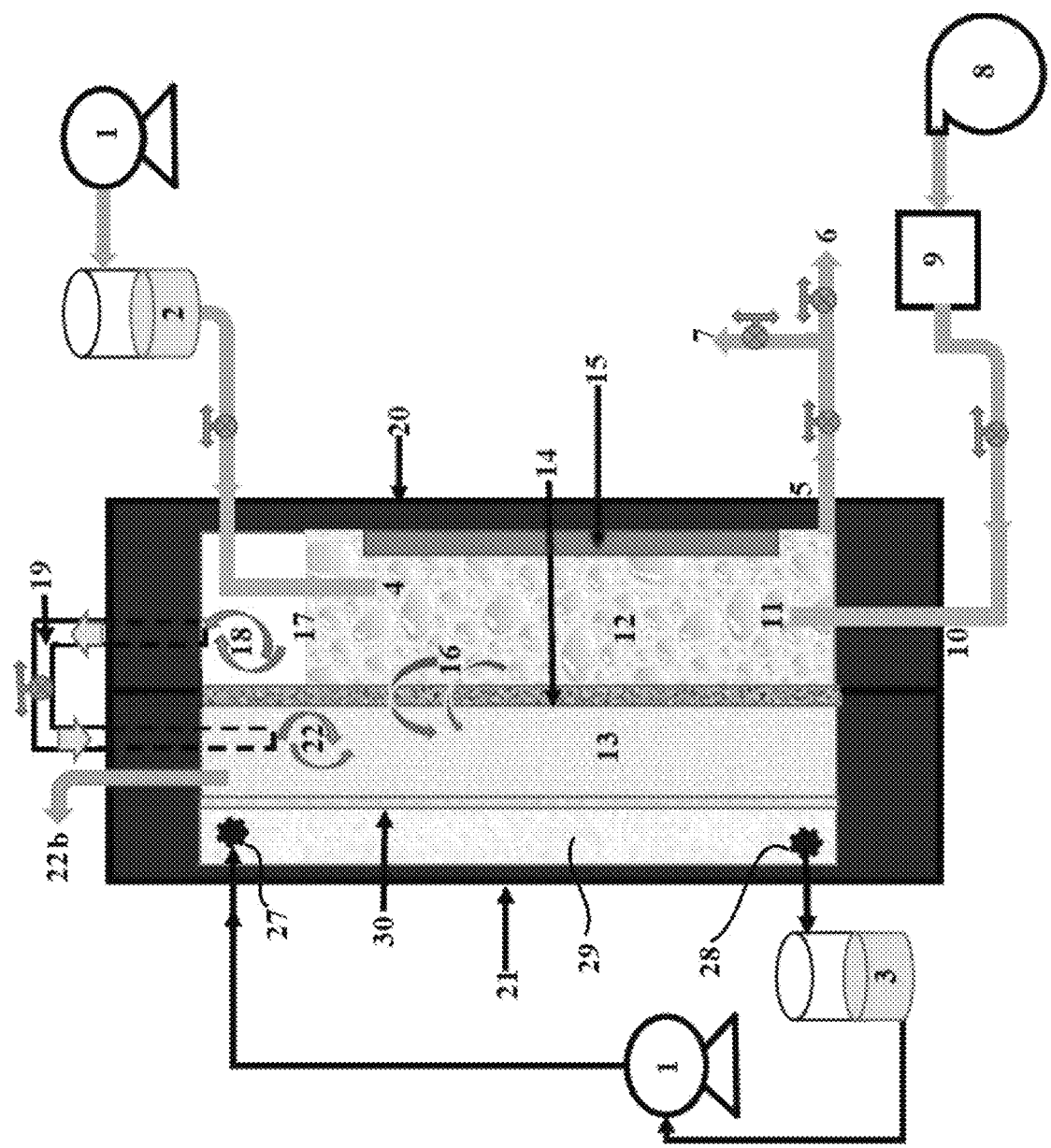
FIG. 2 shows an exemplary arrangement for liquid gap membrane distillation.
Figure 3:
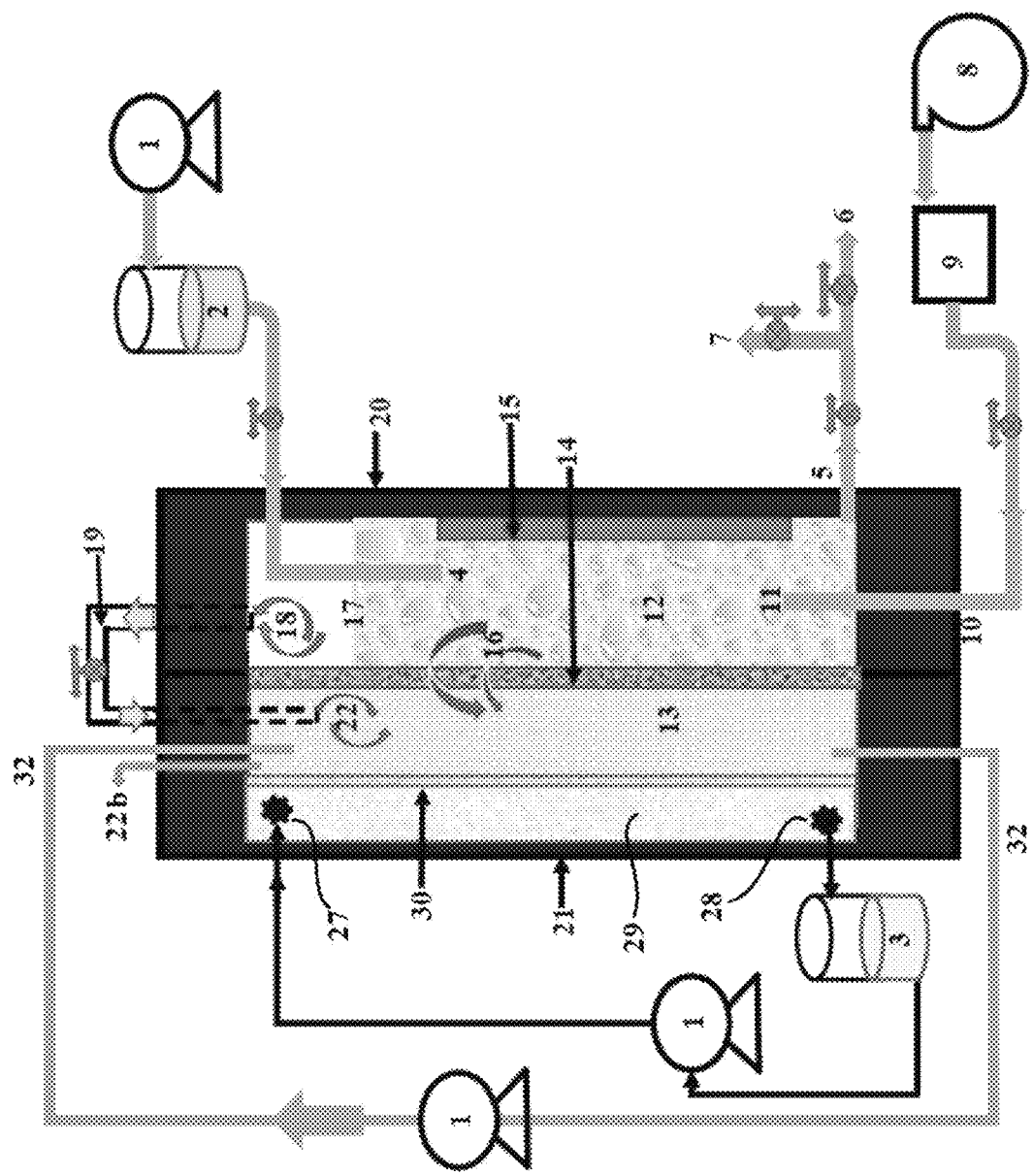
FIG. 3 shows an exemplary arrangement for liquid gap membrane distillation including gap circulation.
Figure 4:
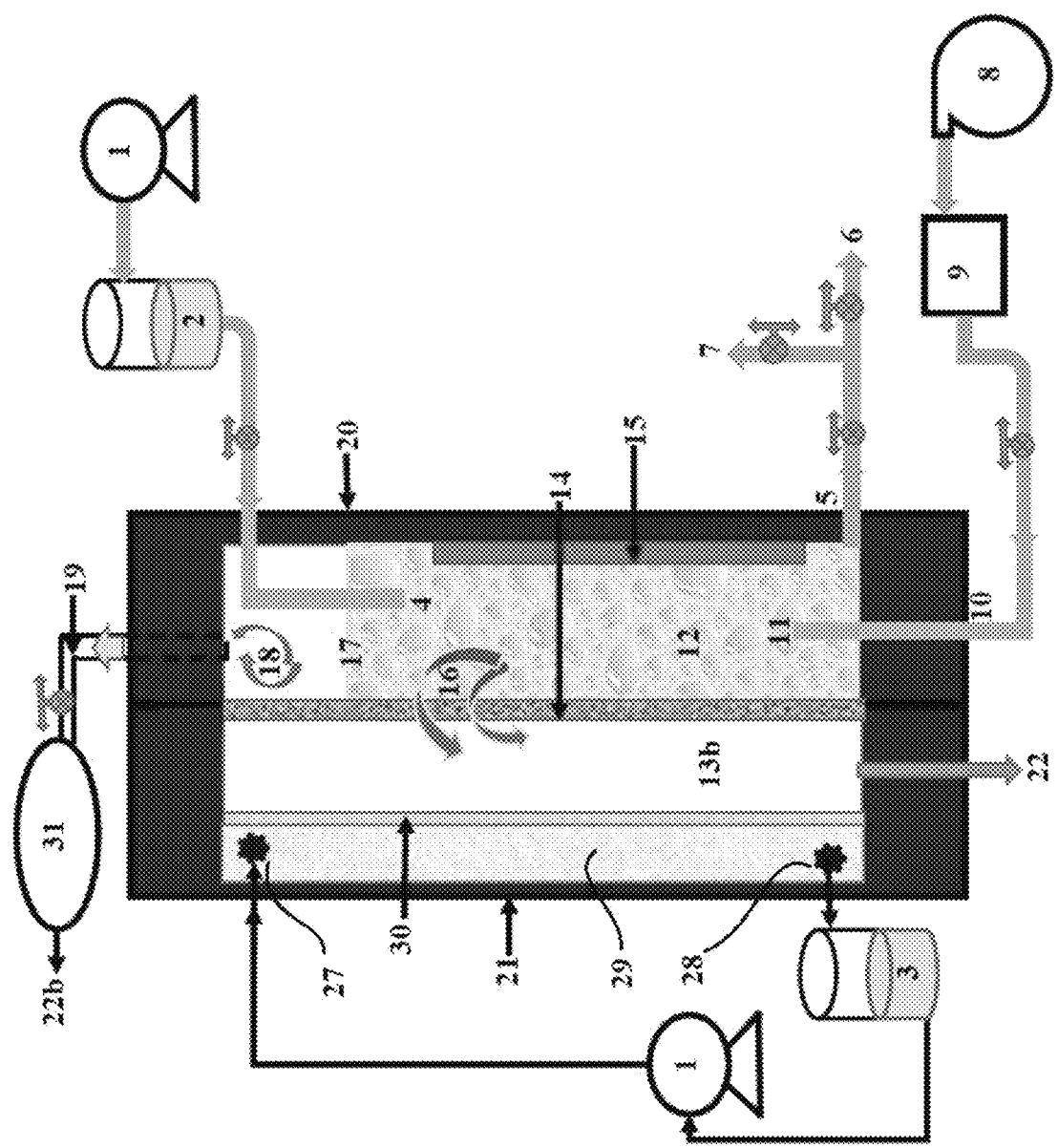
FIG. 4 shows an exemplary arrangement for air gap membrane distillation.
Figure 5:
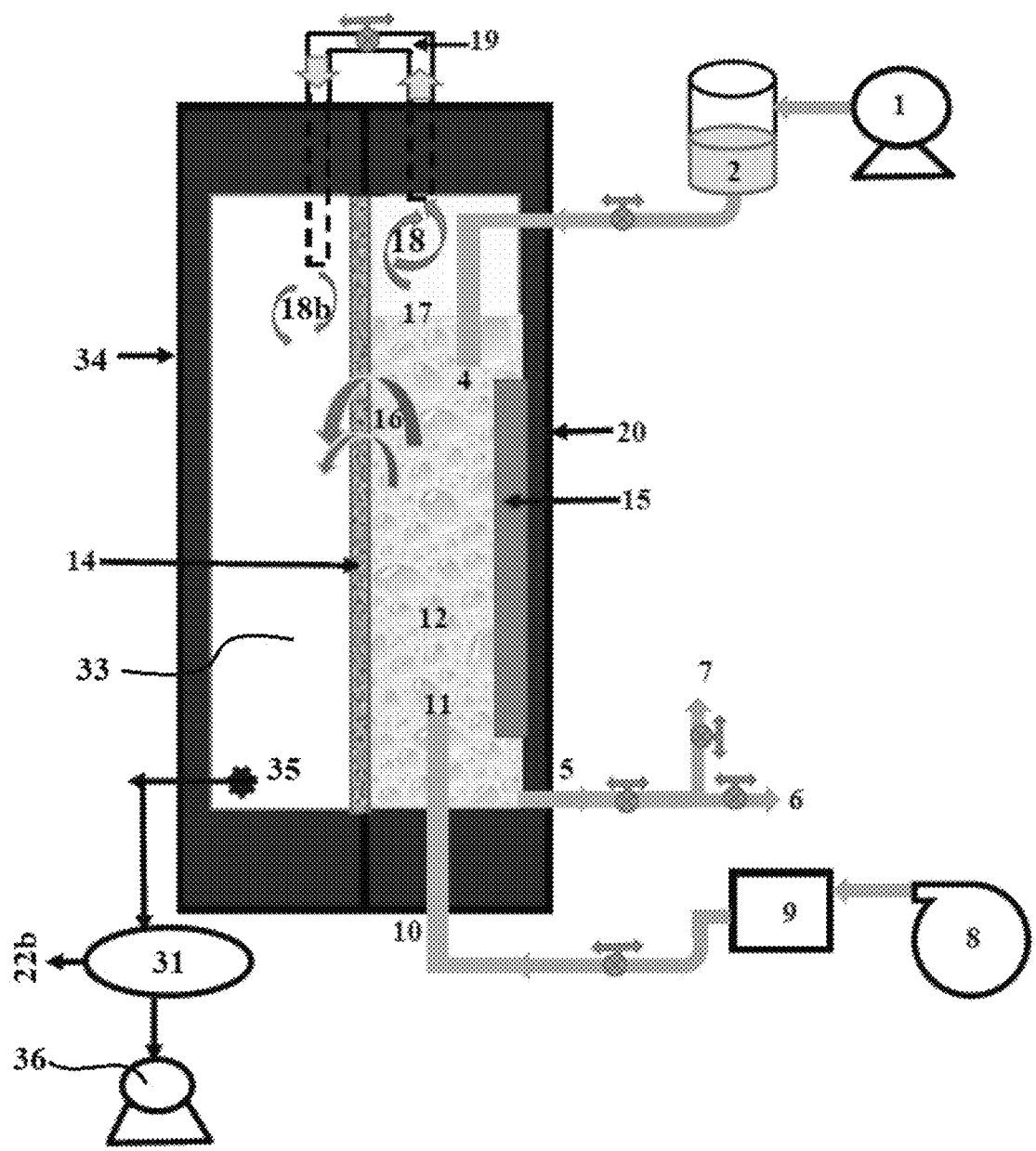
FIG. 5 shows an exemplary arrangement for vacuum membrane distillation.
Figure 6:
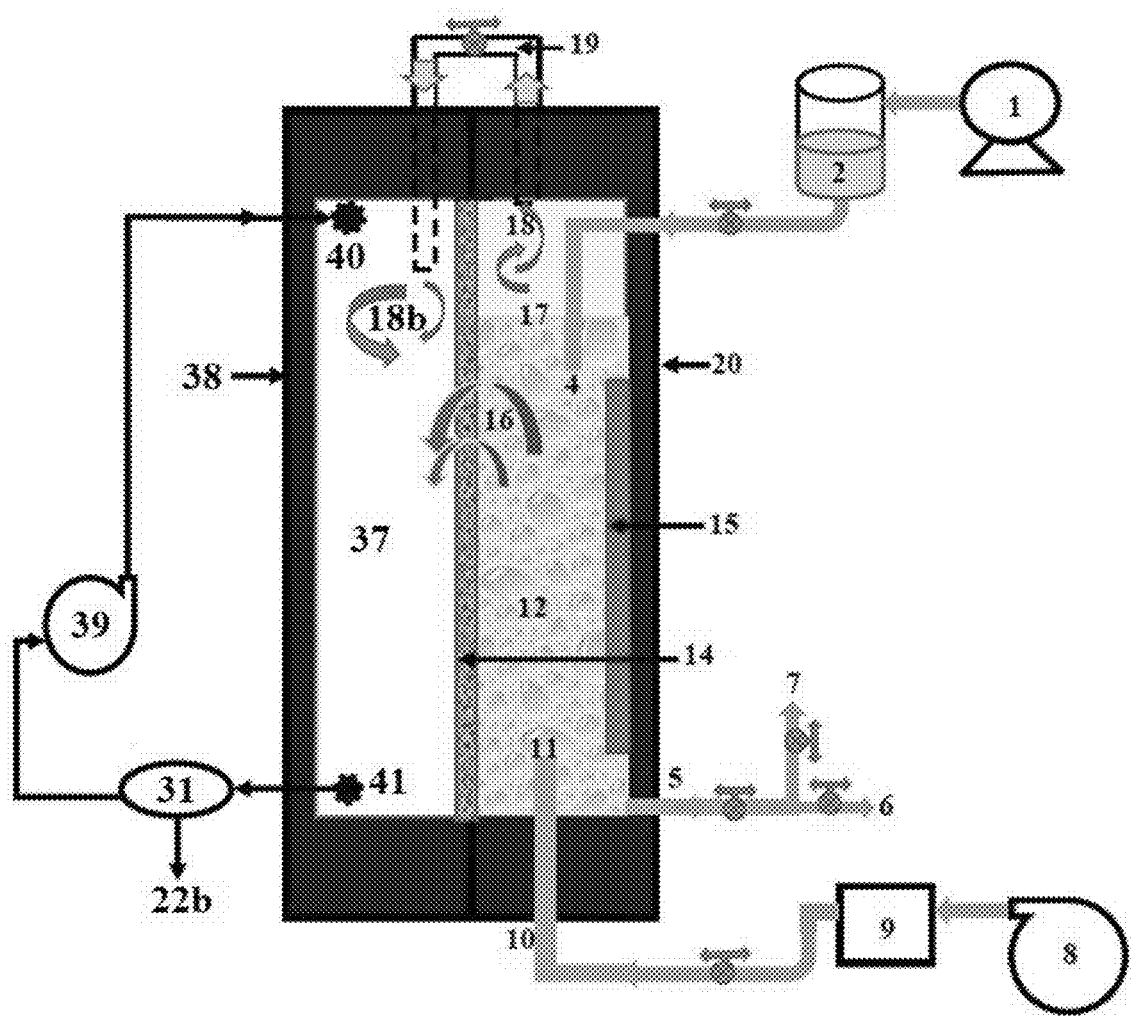
FIG. 6 shows an exemplary arrangement for sweeping gas membrane distillation.

Humidified carrier gas(es) may be condensed on one or more external heat exchangers/condensers, i.e., outside of the still and/or downstream of the bubble chamber and/or still, as seen in FIG. 4, for example. Alternatively or additionally, humidified carrier gas(es) may be condensed on one or more flowing permeate liquids, e.g., as seen in FIG. 1. Alternatively or additionally, humidified carrier gas(es) may be condensed on one or more liquid gaps filled with stagnant permeate liquid(s), e.g., as seen in FIG. 2. Alternatively or additionally, humidified carrier gas(es) may be condensed on one or more liquid gaps filled with recirculating permeate liquid(s), e.g., as seen in FIG. 3. Alternatively or additionally, humidified carrier gas(es) may be vacuumed/sucked, e.g., via underpressure, to the outside of membrane distillation module, e.g., using one or more vacuum pumps, and condensed outside of the module and/or downstream of the still in one or more condensers/heat exchangers, e.g., as seen in FIG. 5. Alternatively or additionally, humidified carrier gas(es) may be swept/urged to the outside of membrane distillation module, e.g., using inert sweep gas(es), and condensed outside of the module and/or downstream of the still in one or more condensers/heat exchangers, e.g., as seen in FIG. 6.

Within the scope of the invention, the bubbling of carrier gas(es) through the feed liquid(s) may be conducted to enhance vapor transfer across the pores of the (typically hydrophobic) membrane material. Here, the term vapor may mean 1, 2, 3, 5, or more gases and/or no more than 10, 9, 8, 7, 6, 5, 4, 3, or 2 gases. Vapor transported across the pores of the membrane may be condensed in one or more permeate zones and/or outside the permeate zone(s). Alternatively or additionally, vapor transported across the pores of the membrane may be condensed on one or more flowing permeate liquids, e.g., as seen in FIG. 1. Alternatively or additionally, vapor transported across the pores of the membrane may be condensed on one or more liquid gaps filled with stagnant permeate liquid(s), e.g., as seen in FIG. 2. Alternatively or additionally, vapor transported across the pores of the membrane can may be condensed on one or more liquid gaps filled with recirculating permeate liquid(s), e.g., as seen in FIG. 3. Alternatively or additionally, vapor transported across the pores of the membrane may be condensed on one or more condensation plates and/or coils after travelling through one or more stagnant air gaps, e.g., as seen in FIG. 4. Alternatively or additionally, vapor transported across the pores of the membrane may be vacuumed/sucked, e.g., via underpressure, to the outside of membrane distillation module, e.g., using one or more vacuum pumps, and condensed outside of the module and/or downstream of the still in one or more condensers/heat exchangers, e.g., as seen in FIG. 5. Alternatively or additionally, vapor transported across the pores of the membrane may be swept/urged to the outside of membrane distillation module, e.g., using inert sweep gas(es), and condensed outside of the module and/or downstream of the still in one or more condensers/heat exchangers, e.g., as seen in FIG. 6.

A suitable type of condenser/heat exchanger may be used for condensing generated vapor. Examples of useful heat exchangers/condensers may include bubble dehumidifiers, surface heat exchangers, liquid spray heat exchangers, double pipe heat exchanger, shell heat exchangers, tube heat exchangers, plate heat exchangers, frame heat exchangers, and/or any other suitable heat exchange device.

Suitable permeate liquid(s) may include, e.g., fresh water, brine, seawater, brackish water, as well as organic solvents, such as those described above, and mixtures of two or more of any of these. Suitable feed liquid(s) may include, e.g., seawater, brine, waste water, brackish water, flowback/produced water, fruit juices, blood, milk, dyes, harmful waste flows, organic solvents, such as those described above, or mixtures of two or more of any of these. Suitable carrier gas(es) may include, e.g., nitrogen, air, steam, helium, argon, carbon dioxide, combustion exhaust, inert gas(es), or mixtures of two or more of any of these.

Feed liquid compartment(s) and permeate liquid compartment(s) may include concurrent and/or counter current flow(s). Carrier gas may be injected in cross flow, counter flow, and/or concurrent flow. Carrier gas injection point(s) into the feed liquid(s) and permeate liquid(s) may be a single point injection or multiple point injections, such as a sparger orifice, or any such multi-point inlet described above. Feed liquid(s) may be heated inside one or more hot feed liquid tanks and/or may be heated somewhere before being stored in such tank(s). Feed liquid(s) may also or alternatively be heated inside the feed liquid compartment(s) of the membrane distillation module.

Compressed carrier gas may be heated or unheated, or multiple streams of either or both may be injected. Heat input into inventive membrane distillation systems may be used for heating only feed liquid(s) or only carrier gas(es), or both feed liquid(s) and carrier gas(es) may be heated simultaneously. Useful heat sources may be from renewable energy sources (solar thermal energy, geothermal energy, solar PV panels, etc.), low-grade energy sources (such as heat or thermal energy, e.g., burner, biogas, biomass, etc.), high-grade energy sources (example, electrical energy), waste heat from other thermal processes (such as furnace, rejected high temperature fluids), fossil fuel, nuclear, or their combinations.

Inventive membrane distillation modules may have layouts including a spiral wound configuration, a tubular membrane configuration, a hollow fiber membrane configuration, and/or a flat sheet, plate, and/or frame membrane configuration.

The membrane distillation configuration may be of direct contact membrane distillation (DCMD), air gap membrane distillation (AGMD), vacuum membrane distillation (VMD), sweeping gas membrane distillation (SGMD), thermostatic sweeping gas membrane distillation (TSGMD), liquid or permeate gap membrane distillation (LPMD or PGMD), or liquid or permeate gap membrane distillation with gap recirculation (LGMD with gap recirculation).

Inventive systems may be employed in desalination, textile industries, chemical industries, pharmaceutical industries, etc., for purification of water, for example. It can be used in milk processing, fruit juice processing, fruit juice concentration, dye removal, concentration of oil-in-water emulsions, concentration of non-volatile acids, and concentration of cooling liquids (glycols). Inventive systems may be used in bio-medical applications, such as in the removal of pure water from blood and protein solutions. Inventive systems may be used in separating azeotropic (aqueous) mixes, such as the separation of alcohol and water mixtures. Inventive systems may be deployed in applications where high temperature processing, e.g., at least 35, 40, 45, 50, 55, 60, 65, 70, 75, 80, 85, 90, 100, 125, 150, 175, or 200° and/or up to 500, 400, 350, 300, 250, 200, 175, 150, 125, 100, or 75° C., causes thermal degradation of the process flow, particularly for the treatment of wastewater.

Typically, the feed side conditions of all known membrane distillation configurations are identical, i.e., the feed liquid is generally maintained in direct contact with the feed side of the membrane. Inventive systems may implement a bubbling gas flow through such feed liquid(s). Differences in the arrangement on the cold side of these configurations lead to their performance differences. Aspects of the invention provide a membrane distillation module a feed compartment of which is injected with at least one bubbling carrier gas. Bubbling the feed liquid with carrier gas can increases the mass transfer coefficient of the module by increasing the turbulent dissipation rate in the feed liquid(s). Increases in the turbulent dissipation rate can enhance mass transfer across the membrane pores to the cooling compartment of the module, thereby improving the rate of vapor permeation. The carrier gas(es) can also carry vapor along as the carrier gas(es) are bubbled through the feed liquid, thereby saturating the carrier gas with vapor, e.g., at least 75, 80, 85, 90, 91, 92, 92.5, 93, 94, 95, 96, 97, 97.5, 98, 99, 99.1, 99.5, 99.9% or more of the capacity of the carrier gas for the vapor. Aspects of the invention provide one, two, or more manners of vapor production, including (i) vapor across the membrane pores and/or (ii) vapor associated with carrier gas.

Aspects of the invention can improve the permeate productivity and/or enhance the energy efficiency of membrane distillation, relative to systems lacking the bubbling. Compared to current convectional membrane distillation offering one-way vapor generation across the membrane pores, inventive systems can provide two-way vapor production (i) vapor across the membrane pores and (ii) vapor carried by the carrier gas(es). Vapor permeation across the pores of the membrane sheet can be enhanced by inventive systems via increases in the turbulent dissipation rate in the feed liquid, e.g., due to increases in the carrier gas flow rate. The pumping power for the feed liquid(s) may be eliminated in the case of stagnant feed liquid condition or natural feed liquid flow condition, thereby by reducing the overall energy consumption of the system.

In general, inventive systems may find application in the desalination industry, textile industry, chemical industry, pharmaceutical industry, wastewater treatment industry, milk processing industry, fruit juice industry (concentration), dyes industry (removal), concentration of oil-in-water emulsions, concentration of non-volatile acids, concentration of cooling liquids (such as glycols), bio-medical applications (such as the removal of pure water from blood and protein solutions), separation of azeotropic aqueous mixes (such as the separation of alcohol and water mixtures), and in applications where high temperature processing causes thermal degradation of the process flow.

Referring now to the drawings, wherein like reference numerals designate identical or corresponding parts throughout the several views.

FIGS. 1 to 7 show general layouts of distillation modules wherein a compressed carrier gas (10) is injected (11) into and bubbled through the hot feed liquid (12) in the feed compartment of the membrane distillation module (20). The carrier gas bubbling through the hot feed liquid (2) can create turbulence in the hot feed liquid (12, 17). Heat and mass/vapor transfer coefficient across the membrane material (14) pores to the cooling compartment of the membrane distillation module increases with the carrier gas superficial velocity due to the increase of the turbulent dissipation rate in the feed liquid (12, 17). The transported mass/vapor (16) to the cooling compartment may be condensed by any known devices tailored for the membrane distillation configuration. The carrier gas is also humidified (18) as it bubbled through the hot feed liquid level (17) in the feed liquid compartment (20). The humidified carrier gas (18) is injected (22) into the cooling compartment of the membrane distillation module through a duct (19). The humidified carrier gas (18) may also be transported to the external heat exchanger (31) for condensation (22, 22b) of the vapor content present in the carrier gas. In each system, the process of evaporation and permeation of vapor (16) across the membrane material/sheet (14) from the feed liquid compartment (20) may be identical, while the condensation (22, 22b) or cooling of vapor in the coolant side compartment differs.

FIG. 1 illustrates an exemplary bubble feed direct contact membrane distillation (BF-DCMD). The process of evaporation and permeation of vapor across the membrane sheet (14) can involve hot/ambient (9) carrier gas (8) is compressed (10) and injected (11) into hot feed liquid (12, 17). The injected carrier gas (11) creates turbulence in the hot feed liquid (12). The turbulence can enhance the heat and mass/vapor (16) transfer across the membrane (14). The carrier gas exits the feed liquid (12) with some vapor (18) content and is ducted/piped (19) to cooling liquid (13). On the coolant/permeate side (21), the transported vapor (16) across the membrane (14) is condensed on the flowing permeate liquid (25, 13, 26) in the permeate compartment (21). The vapor associated with carrier gas can be equally injected (22) into the permeate liquid (25, 13, 26) for condensation in the coolant compartment. For simplicity, FIG. 1 does not show the outlet for the permeate liquid, which may be arranged in any manner described herein or otherwise used in the art.

FIG. 2 illustrates an exemplary bubble feed liquid gap membrane distillation (BF-LGMD). A substantially similar process and steps to FIG. 1 takes place in FIG. 2, except that the coolant compartment (21) is separated into two parts by a condensation plate (30). Permeate liquid (13) can fill the gap between the cooling plate (30) and cooling side of the membrane surface (14). In the exemplary system shown in FIG. 2, the vapor across the membrane (16) condenses on the permeate liquid (13) that filled the gap between the membrane surface (13) and the cooling/condensation plate (30). The vapor associated with carrier gas (18) is also injected (22) into the permeate liquid (13) that filled the gap between the membrane surface (14) and the cooling/condensation plate (30). The condensation plate (30) can be kept cold by coolant liquid (29) flowing (27 to 28) over the other side of the cooling plate (30). The product permeate is collected at point (22b).

FIG. 3 reveals an exemplary bubble feed liquid gap membrane distillation (BF-LGMD) with gap circulation. A substantially similar process and steps in FIG. 2 takes place in FIG. 3 except that in FIG. 3, the permeate liquid gap is recirculated (32).

FIG. 4 shows an exemplary bubble feed air gap membrane distillation (BF-AGMD). A substantially similar process and steps to FIG. 2 takes place in FIG. 4, except that instead of permeate liquid in the gap, a stagnant air gap (13b) is interposed between the membrane surface (14) and condensation surface (30). In the exemplary configuration shown in FIG. 4, the vapor travel across the membrane pores (14) and the air gap (13b) to condense on cooling plate (30). The vapor associated with the carrier gas (18) is not injected into the air gap (13b), instead it is ducted (19) out of the module and condensed by one or more external heat exchangers/condensers (31). The heat exchanger (31) may be bubble dehumidifiers, surface heat exchangers, liquid spray heat exchangers, etc., or combinations of these. The product permeate (16) across the membrane (14) can be collected at point (22), while the product permeate (18) associated with the carrier gas is collected at point (22b).

FIG. 5 illustrates an exemplary bubble feed vacuum membrane distillation (BF-VMD). A substantially similar process and steps to FIG. 1 takes place in FIG. 5, except that vacuum pressure (33) is applied on the permeate compartment (34) to remove the vapor carried by the carrier gas (18b) and vapor (16) across the membrane (14). The vacuum pressure can be created by one or more vacuum pumps (36) through one or more vacuum outlets (35). The removed vapors are condensed outside the membrane distillation module using one or more external condensers/heat exchangers (31), and the produced permeate is collected at point (22b).

FIG. 6 shows an exemplary bubble feed sweeping gas membrane distillation (BF-SGMD). A substantially similar process and steps to FIG. 1 takes place in FIG. 6, except that the flowing permeate liquid (16) is replaced by a generally cold inert sweep gas (40 to 41). The inert sweep gas (37) can sweep the vapor (16) that crosses the membrane pores (14) and is contained in the carrier gas (18). The swept vapors from the sweep gas compartment (38) are condensed outside the membrane distillation module using one or more external condensers/heat exchangers (31). The condensed vapor/product is collected at point (22b).

Figure 7:
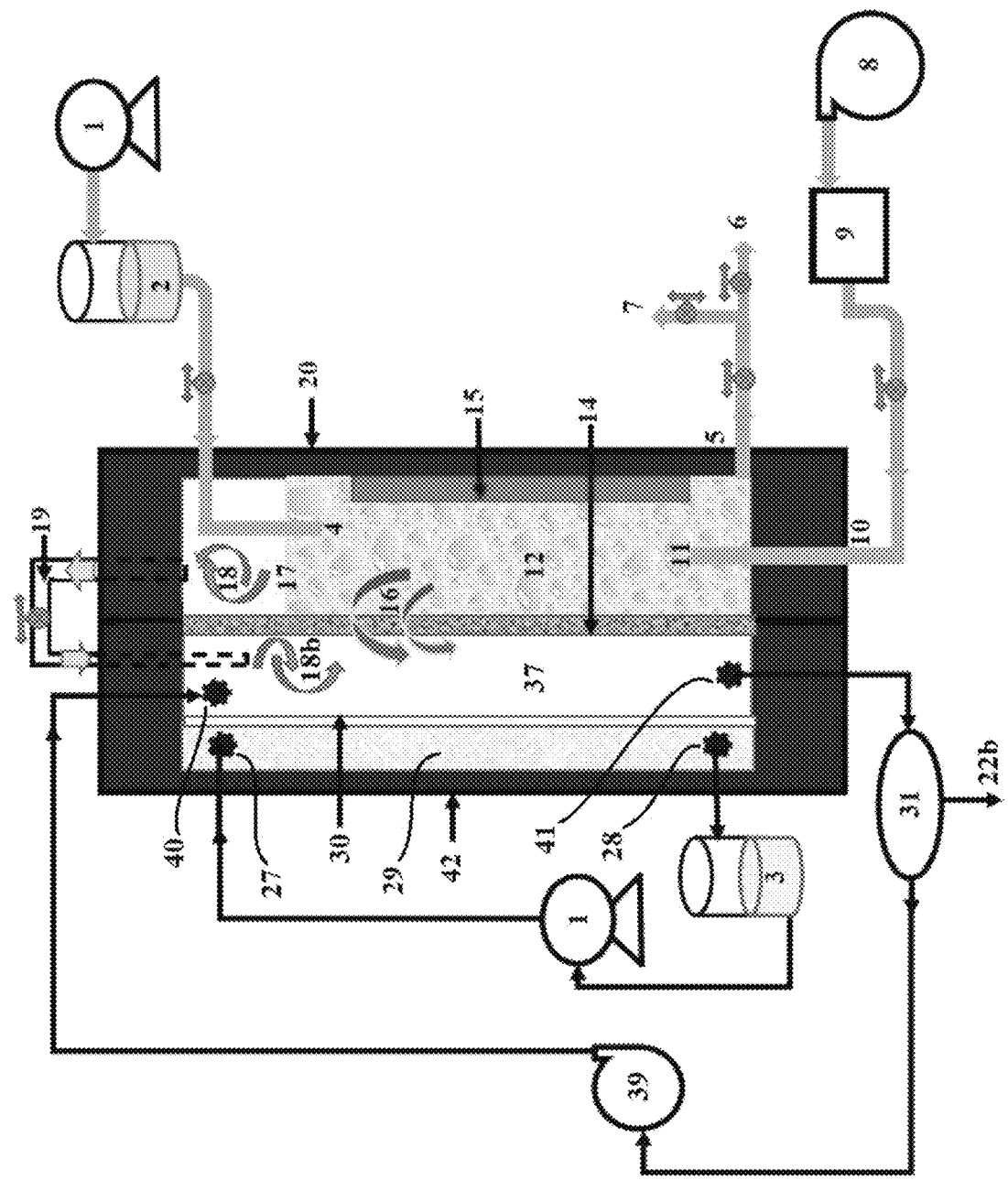
FIG. 7 shows an exemplary arrangement for thermostatic sweeping gas membrane distillation.

FIG. 7 shows an exemplary bubble feed thermostatic sweeping gas membrane distillation (BF-TSGMD). A substantially similar process and steps to FIG. 6 takes place in FIG. 7, except that an additional cold wall (30) is provided in the permeate compartment (37) to decrease the inert sweep gas temperature (40 to 41). The cold wall/plate (30) is maintained at a low temperature by flowing coolant liquid (27 to 28) inside the coolant chamber (42).

Figure 8:
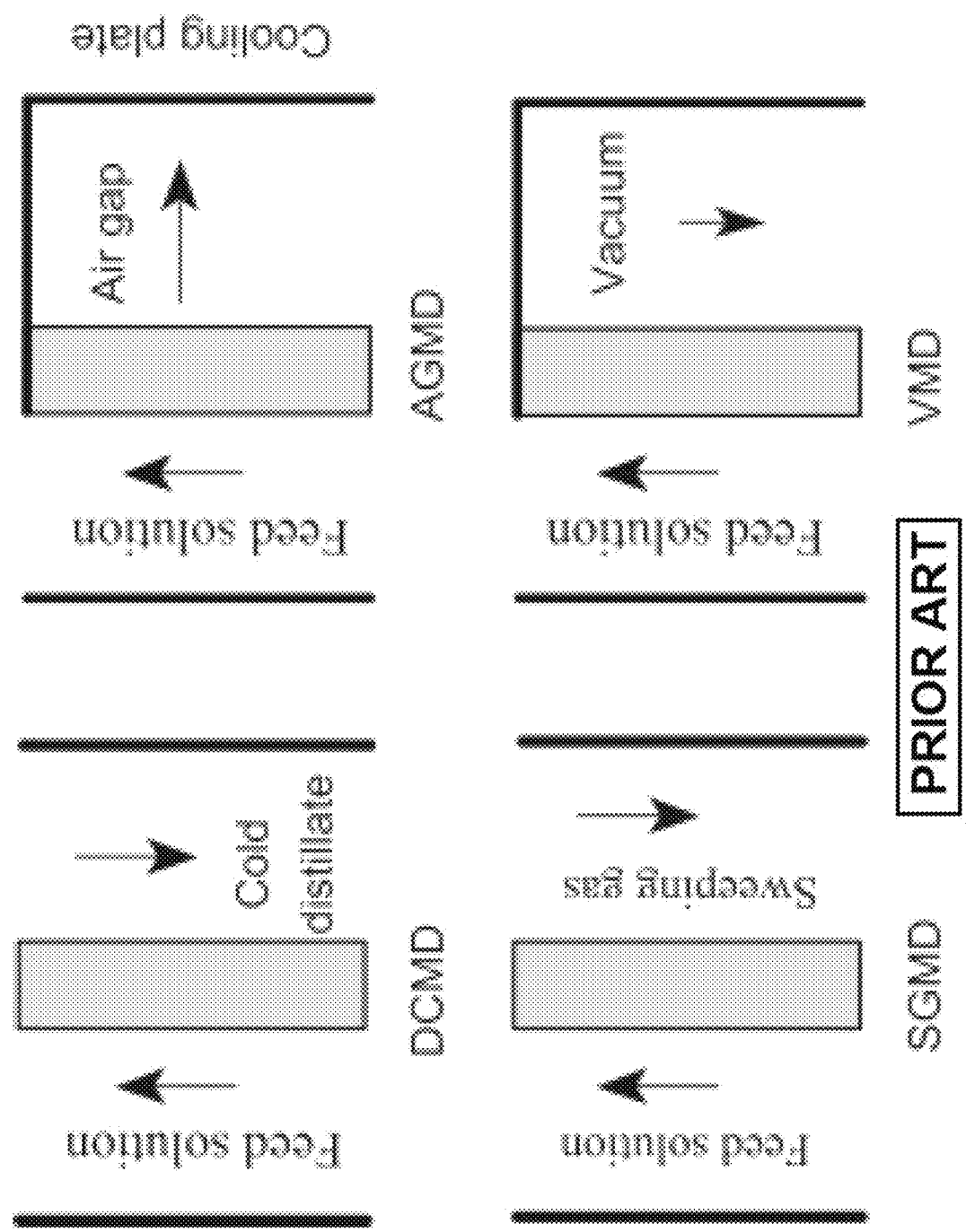
FIG. 8 shows four main established configurations of membrane distillation processes.
Figure 9:
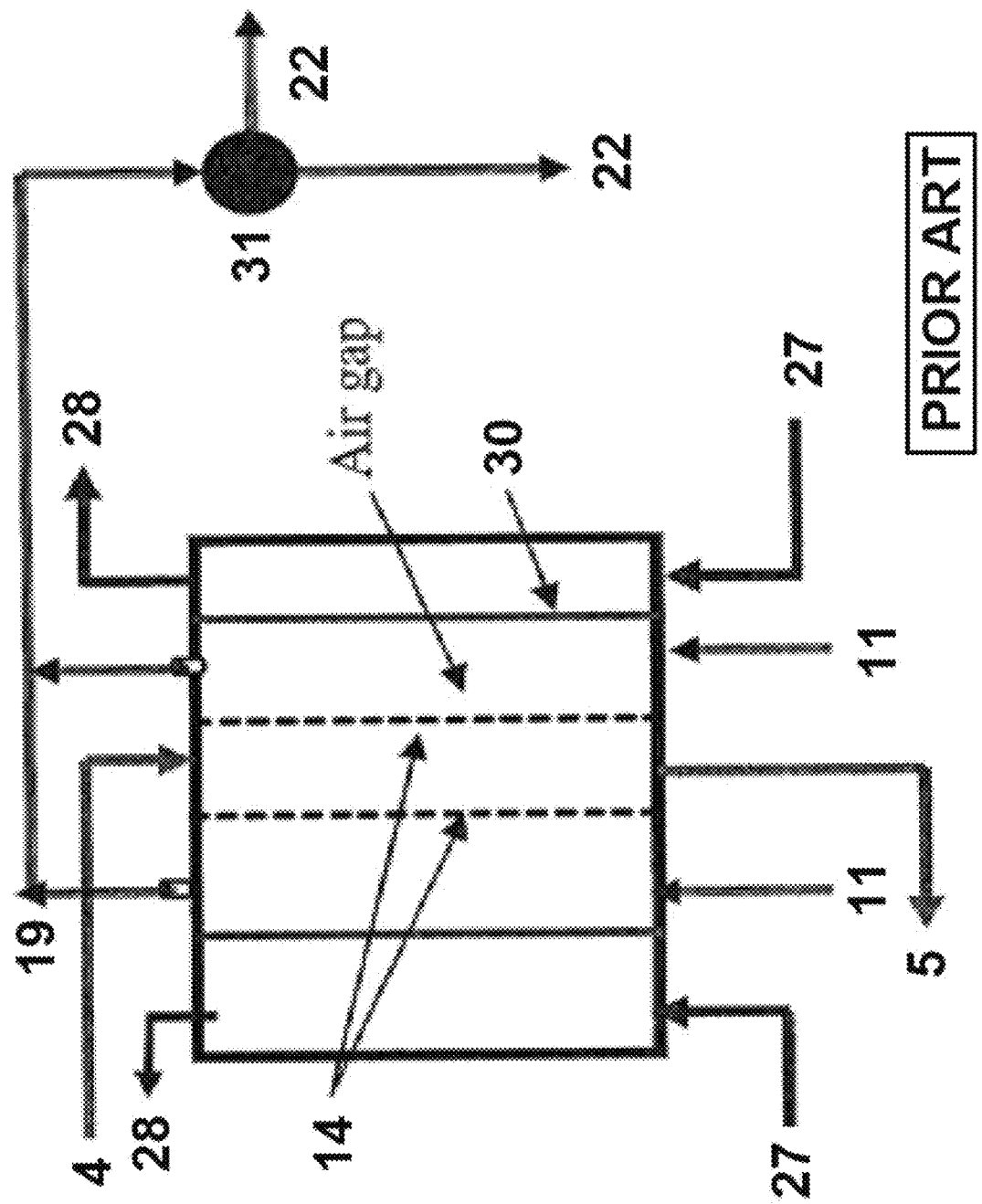
FIG. 9 shows an exemplary known arrangement for thermostatic sweeping gas membrane distillation.
Figure 10:
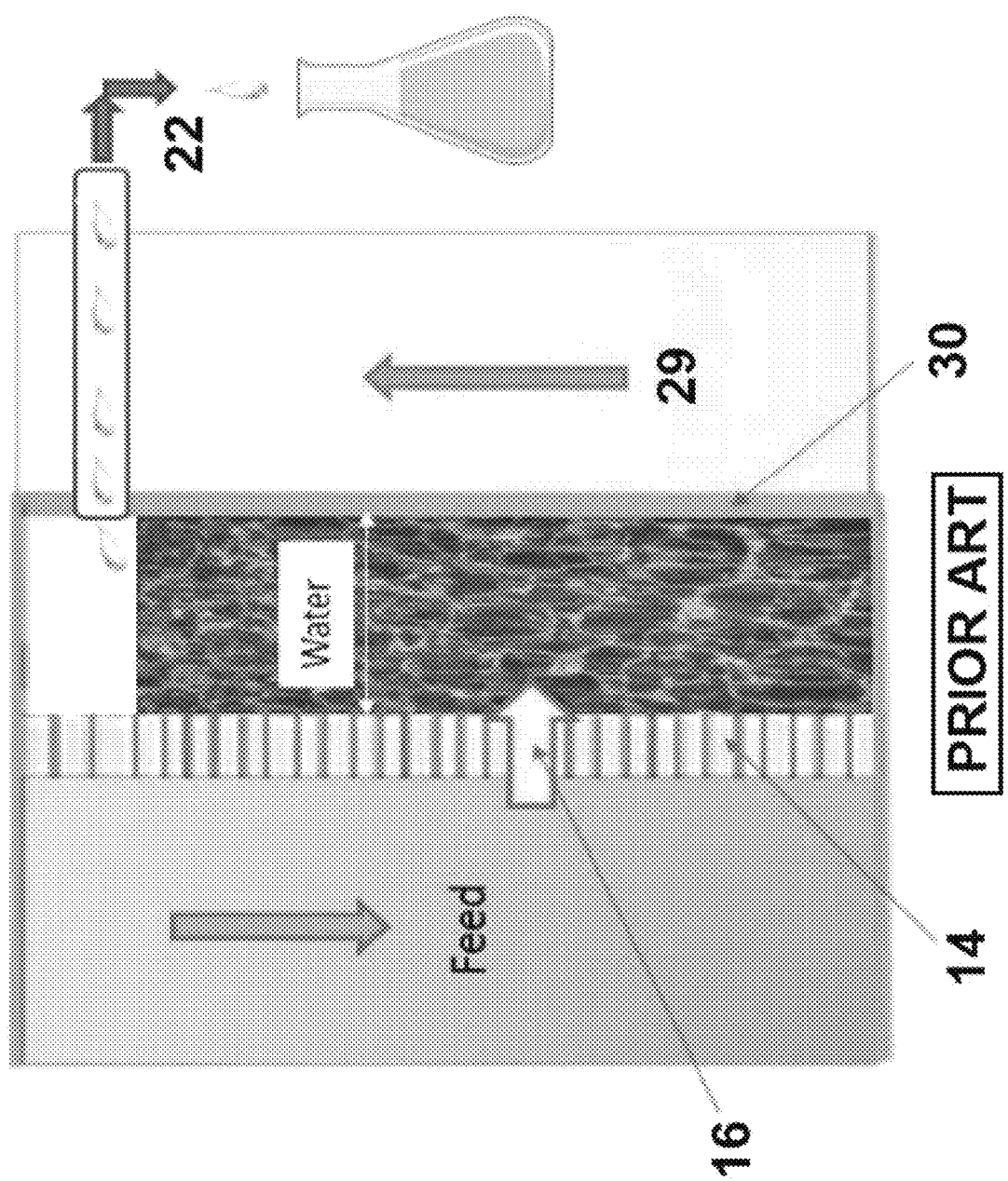
FIG. 10 shows an exemplary known arrangement for liquid gap membrane distillation.

FIGS. 8 to 10 show customary membrane distillations, lacking at least the bubble feed feature described herein. FIG. 8 illustrates a typical direct contact membrane distillation (DCMD) arrangement in the upper left, a typical air gap membrane distillation (AGMD) arrangement in the upper right, a typical sweeping gas membrane distillation (SGMD) arrangement in the lower left, and a typical vacuum membrane distillation (VMD) arrangement in the lower right. FIG. 9 shows a customary thermostatic sweeping gas membrane distillation (TSGMD) arrangement. FIG. 10 shows a customary liquid gap membrane distillation (LGMD) arrangement.

Numerous modifications and variations of the present invention are possible in light of the above teachings. It is therefore to be understood that within the scope of the appended claims, the invention may be practiced otherwise than as specifically described herein.

REFERENCE SIGNS 1 pump
2 hot feed liquid tank
3 cold coolant liquid tank
4 inlet hot feed liquid
5 exit concentrated feed liquid
6 rejected concentrated feed liquid
7 recycled concentrated feed liquid
8 blower/compressor
9 carrier gas heater
10 compressed carrier gas
11 injected carrier gas
12 feed liquid-carrier gas
13 permeate liquid
13b stagnant air gap
14 membrane material
15 feed liquid heater
16 vapor/mass transfer across membrane pores
17 feed liquid height
18 humidified carrier gas
19 ducted humidified carrier gas
20 feed liquid compartment
21 coolant liquid compartment
22(b) condensed vapor/product
23 cold permeate liquid tank
25 permeate liquid inlet
26 permeate liquid outlet
27 coolant inlet
28 coolant outlet
29 coolant liquid
30 condensation plate
31 external condenser/heat exchanger
32 permeate gap circulation
33 vacuum
34 vacuum compartment
35 vacuum outlet
36 vacuum pump
37 sweep gas
38 sweep gas compartment
39 blower/fan
40 sweep gas inlet
41 sweep gas outlet
42 sweep gas/coolant compartment

The invention claimed is:

1. A membrane distillation module, comprising:
a vessel with an internal cavity;
a hydrophobic membrane dividing the internal cavity into a feed zone and a distillate zone, such that the feed zone and the distillate zone are accessible to each other within the internal cavity only via permeation across the membrane;
a feed inlet fluidly connected to the feed zone for delivering a feed stream, comprising a liquid, to the feed zone;
a feed outlet fluidly connected to the feed zone for discharging the feed stream from the feed zone;

a carrier gas inlet fluidly connected to the feed zone for introducing a carrier gas to the feed zone;

a carrier gas outlet fluidly connected to the feed zone and further to the distillate zone, configured to bypass the membrane and transfer a portion of the carrier gas and feed stream vapor from the feed zone to the distillate zone and optionally further to an external condenser;

a distillate outlet fluidly connected to the distillate zone; and wherein the carrier gas inlet enters the feed zone within the internal cavity, wherein the membrane is configured such that a portion of the feed stream vapor permeates through the hydrophobic membrane and is transferred to the distillate zone, and wherein the distillate zone is configured such that the vapor condenses in the distillate zone in the form of a distillate.

2. The module of claim 1, wherein the carrier gas outlet is fluidly connected to the distillate zone.

3. The module of claim 1, further comprising:
a blower and/or a pump fluidly connected to the carrier gas inlet.

4. The module of claim 1, further comprising:
a blower and/or a pump fluidly connected to the feed inlet.

5. The module of claim 1, further comprising:
a thermally conductive divider disposed in the distillate zone to separate a coolant zone from the distillate zone such that the distillate zone is sandwiched between the feed zone and the coolant zone;
a coolant;
a coolant inlet fluidly connected to the coolant zone suitable for delivering the coolant to the coolant zone; and
a coolant outlet fluidly connected to the coolant zone suitable for discharging the coolant from the coolant zone.

6. The module of claim 5, further comprising:
a coolant circulating line disposed outside of the internal cavity configured to fluidly connect the coolant outlet to the coolant inlet; and
a coolant pump fluidly connected to the coolant circulating line, configured to circulate at least a portion of the coolant in the coolant zone.

7. The module of claim 1, further comprising:
a condenser in the distillate zone, the condenser being at a lower temperature than the feed zone;
a condenser supply, including a condenser inlet, a condenser outlet, and a condenser feed, the condenser supply being configured such that the condenser feed flows through the condenser inlet into the condenser and out of the condenser outlet; and
a condenser pump fluidly connected to the condenser inlet, configured to urge the condenser feed through the condenser.

8. The module of claim 7, wherein the condenser supply is a closed cycle, such that the volume of the condenser feed remains substantially constant in operation.

9. The module of claim 1, further comprising:
a distillate circulating line disposed outside of the distillate zone configured to fluidly connect the distillate outlet to the distillate inlet; and
a pump fluidly connected to the distillate circulating line, configured to circulate at least a portion of the distilled water in the distillate zone.

10. The module of claim 1, further comprising:
a heater in fluid contact to the carrier gas, configured to heat the carrier gas before the carrier gas is introduced into the feed zone.

11. The module of claim 10, wherein the heater is in direct contact with the carrier gas.

12. The module of claim 1, further comprising:
a heater in fluid contact to the feed stream, configured to heat the feed stream before the feed stream is introduced into the feed zone.

13. The module of claim 12, wherein the heater is in direct contact with the feed stream.

14. The module of claim 1, further comprising:
a vacuum pump in fluid communication to the distillate zone,
wherein the carrier gas outlet is fluidly connected to the distillate zone.

15. The module of claim 1, wherein the carrier gas inlet is configured to inject carrier gas including bubbles with an average longest dimension of greater than 5 $\mu$m.

16. The module of claim 1, wherein the carrier gas includes air.

17. The module of claim 1, wherein the feed stream includes ocean and/or saline seawater.

18. A method of concentrating and/or purifying a feed stream, the method comprising:
contacting the feed stream, comprising a liquid and a vapor, with the carrier gas in the feed zone of the module of claim 1, and obtaining a permeate containing water in the distillate zone and a concentrated feed stream from the feed stream outlet.

* * * * *